United States Patent [19]
Hayashi

[11] Patent Number: 5,441,227
[45] Date of Patent: Aug. 15, 1995

[54] MOUNTING STRUCTURE FOR MODULAR-TYPE WIPER DEVICE

[75] Inventor: Akira Hayashi, Kiryu, Japan

[73] Assignee: Mitsuba Electric Manufacturing Co., Ltd., Gunma, Japan

[21] Appl. No.: 221,535

[22] Filed: Mar. 31, 1994

Related U.S. Application Data

[63] Continuation of Ser. No. 915,615, Jul. 21, 1992, abandoned.

[30] Foreign Application Priority Data

Jul. 30, 1991 [JP] Japan .................. 3-067214

[51] Int. Cl.6 .............................................. B60S 1/04
[52] U.S. Cl. ........................... 248/274; 15/250.3; 15/250.31
[58] Field of Search ............ 15/250.01, 250.30, 250.31, 15/250.27, 250.11, 250.32; 248/274

[56] References Cited

U.S. PATENT DOCUMENTS

| | | | |
|---|---|---|---|
| 2,696,962 | 12/1954 | Goss | 248/274 X |
| 3,829,924 | 8/1974 | Dittrich et al. | 15/250.27 X |
| 4,754,857 | 7/1988 | Urban | 248/274 |
| 4,893,865 | 1/1990 | McClain et al. | 15/250.01 X |
| 4,988,144 | 1/1991 | Johnson et al. | 15/250.16 X |
| 5,074,613 | 12/1991 | Unterborn et al. | 15/250.31 X |
| 5,142,941 | 9/1992 | Amann et al. | 15/250.3 X |
| 5,222,706 | 6/1993 | Hoshino | 15/250.31 X |

FOREIGN PATENT DOCUMENTS

| | | | |
|---|---|---|---|
| 2227926 | 8/1990 | United Kingdom | 15/250.30 |
| 2228188 | 8/1990 | United Kingdom | |

Primary Examiner—Rinaldi I. Rada
Attorney, Agent, or Firm—Oliff & Berridge

[57] ABSTRACT

A mounting structure for a modular-type wiper device includes brackets provided with mounting holes, one of which is formed as a small-diameter mounting hole whose diameter is smaller than that of the remaining mounting holes so as to reduce the clearance between it and the bolt passed therethrough, and a mounting seat corresponding to this small-diameter mounting hole is provided directly on a cowl of a vehicle body, the wiper device being mounted on the vehicle body by using this mounting seat as a mounting reference.

8 Claims, 8 Drawing Sheets

MOUNTING STRUCTURE FOR MODULAR-TYPE WIPER DEVICE

This is a Continuation of application Ser. No. 07/915,615, filed Jul. 21, 1992, now abandoned.

BACKGROUND OF THE INVENTION

1. Field of the Invention

The present invention relates to a mounting structure for a modular-type wiper device to be mounted on a vehicle such as a passenger car, bus, or truck.

2. Description of the Related Art

A modular-type wiper device is an integral unit comprising various wiper components including pivot shafts, a wiper motor, and a wiper link mechanism. Such an integral unit is mounted on a vehicle body. Thus, as compared with wiper devices whose components are separately mounted, the modular-type wiper device has an advantage that the mounting operation is relatively simple and the device strength can be enhanced, as needed, without depending upon the strength of the associated vehicle body. For this reason, wiper devices of this type are being used extensively nowadays.

Such a modular-type wiper device is mounted on a vehicle body in the following manner: The various components of the wiper device are incorporated into brackets, which have a plurality of mounting holes. Mounting seats, corresponding with these mounting holes, are provided on the vehicle body, to which the bracket is fastened by means of bolts and nuts. A problem with this structure is that there is disparity in the mounting pitch of the various wiper components and in the pitch of the mounting seats on the vehicle body. The wiper device must be mounted to compensate for this disparity. Conventionally, the compensation of this disparity has been effected by providing clearance between the mounting holes and the bolts passed therethrough.

Such an arrangement, however, entails another problem; the generation of a positional disparity between the vehicle body and the wiper device itself makes it impossible to effect the mounting with high accuracy.

SUMMARY OF THE INVENTION

The present invention has been made in view of the above problems in the related art. It is an object of the present invention to provide a mounting structure for a modular-type wiper device which helps to clear away these problems. In accordance with the present invention, a mounting structure is provided for a modular-type wiper device which is in the form of an integral unit including various wiper components such as pivot shafts, a wiper motor, and a wiper link mechanism, the mounting structure comprising: brackets into which the above-mentioned wiper components are incorporated and which are provided with a plurality of mounting holes; and mounting seats, provided on a vehicle body, corresponding to the above-mentioned mounting holes, the wiper device being mounted and fastened by means of bolts and nuts, wherein at least one of the plurality of mounting holes is made as a small-diameter mounting hole whose diameter is smaller than that of the remaining mounting holes so as to reduce the clearance between it and the bolt passed therethrough, and wherein the mounting seat for the bolt passed through the abovementioned small-diameter mounting hole is provided directly on a cowl of the vehicle body.

With the above construction, the present invention enables a modular-type wiper device to be mounted on a vehicle body accurately and easily.

DETAILED DESCRIPTION OF THE PREFERRED EMBODIMENTS

Figure 1:
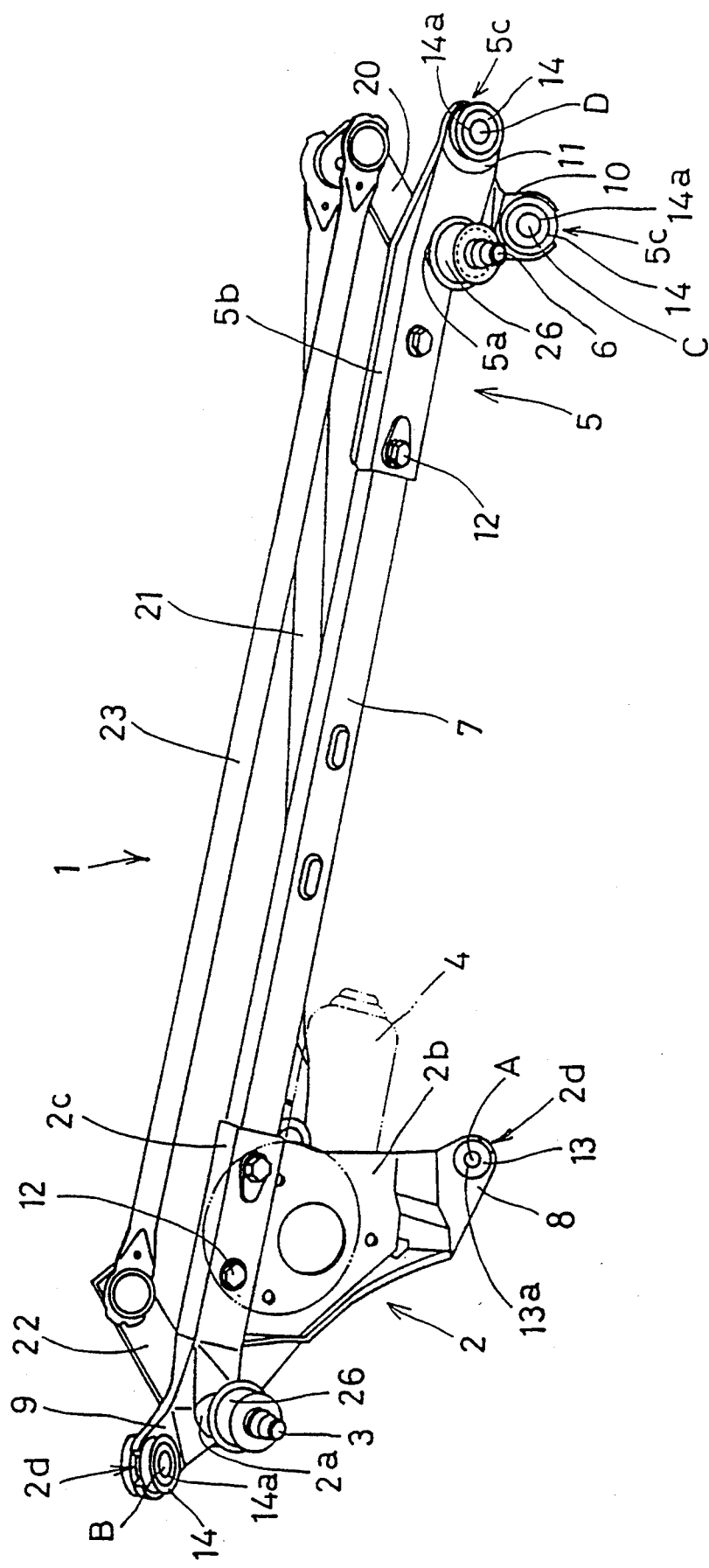
FIG. 1 is a plan view of a wiper device.

An embodiment of the present invention will now be described with reference to the drawings. In FIG. 1 a modular-type wiper device 1 is shown which includes first and second brackets 2 and 5. Formed on the first bracket 2 are: a sleeve 2a through which a first pivot shaft 3 is rotatably inserted, a pair of mounting sections 8 and 9 for integrally mounting the wiper device on a vehicle body, and a motor attachment section 2b to which a wiper motor 4 is attached. Formed on the second bracket 5 are: a sleeve 5a into which a second pivot 6 is rotatably inserted, and a pair of mounting sections 10 and 11 for integrally mounting the device on the vehicle body. Each of the first and second brackets 2 and 5 is formed as an integral unit by aluminum die-casting (which may naturally be replaced by zinc die-casting). Further formed on the first and second brackets 2 and 5 are connecting sections 2c and 5b having a substantially U-shaped cross-sectional configuration. A frame member 7, likewise having a substantially U-shaped cross-sectional configuration, is fitted into the connecting sections 2c and 5b and integrally fastened thereto by means of bolts and nuts 12, thereby integrating the brackets 2 and 5 into one unit to form the modular-type wiper device 1. Further, a first wiper link 21 is provided between a motor arm (not shown) attached to the motor shaft of the wiper motor 4 and a link arm 20 provided on the pivot shaft 6 on the side of the second bracket 5, and a second wiper link 23 is provided between the link arm 20 and a link arm 22 provided on the pivot shaft 3 on the side of the first bracket 2.

The mounting sections 8, 9, 10 and 11 are provided with mounting grooves 2d and 5c which are formed on the brackets 2 and 5, respectively, and setting rubbers, each having a hole, are set in these mounting grooves. A metal cylindrical member is fitted into the hole of each setting rubber. A setting rubber 13 set in the mounting groove 2d of the mounting bracket 8, one of the mounting sections of the first bracket 2, has a mounting hole A whose diameter is smaller than that of mounting holes B, C and D of setting rubbers 14 which are set in the remaining mounting grooves, i.e., the other mounting groove 2d and the mounting grooves 5c. Accordingly, the diameter of a metal cylindrical member 13a fitted into the setting rubber 13 has a diameter which is smaller than that of metal cylindrical members 14a which are fitted into the setting rubbers 14.

Figure 2:
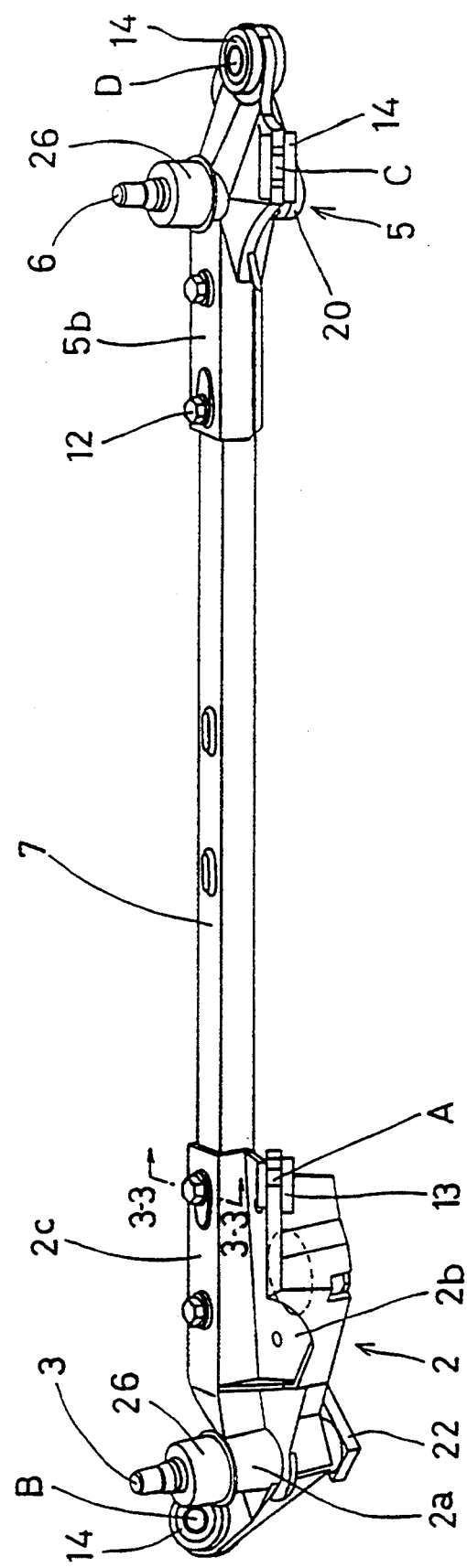
FIG. 2 is a front view of the wiper device, with the wiper motor and link device thereof omitted.
Figure 3:
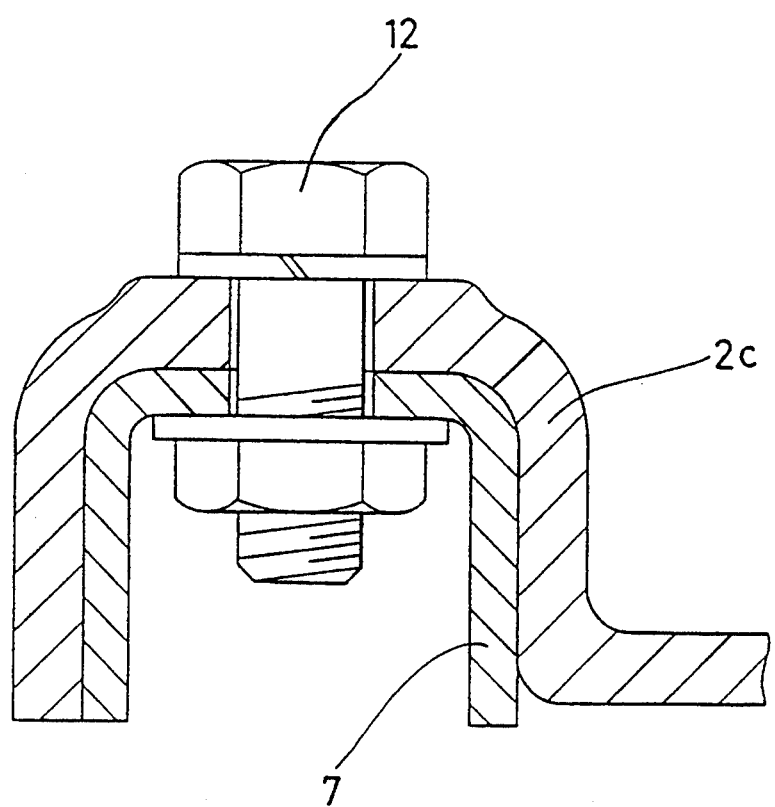
FIG. 3 is a sectional view taken along the line 3—3 of FIG. 2.
Figure 4A:
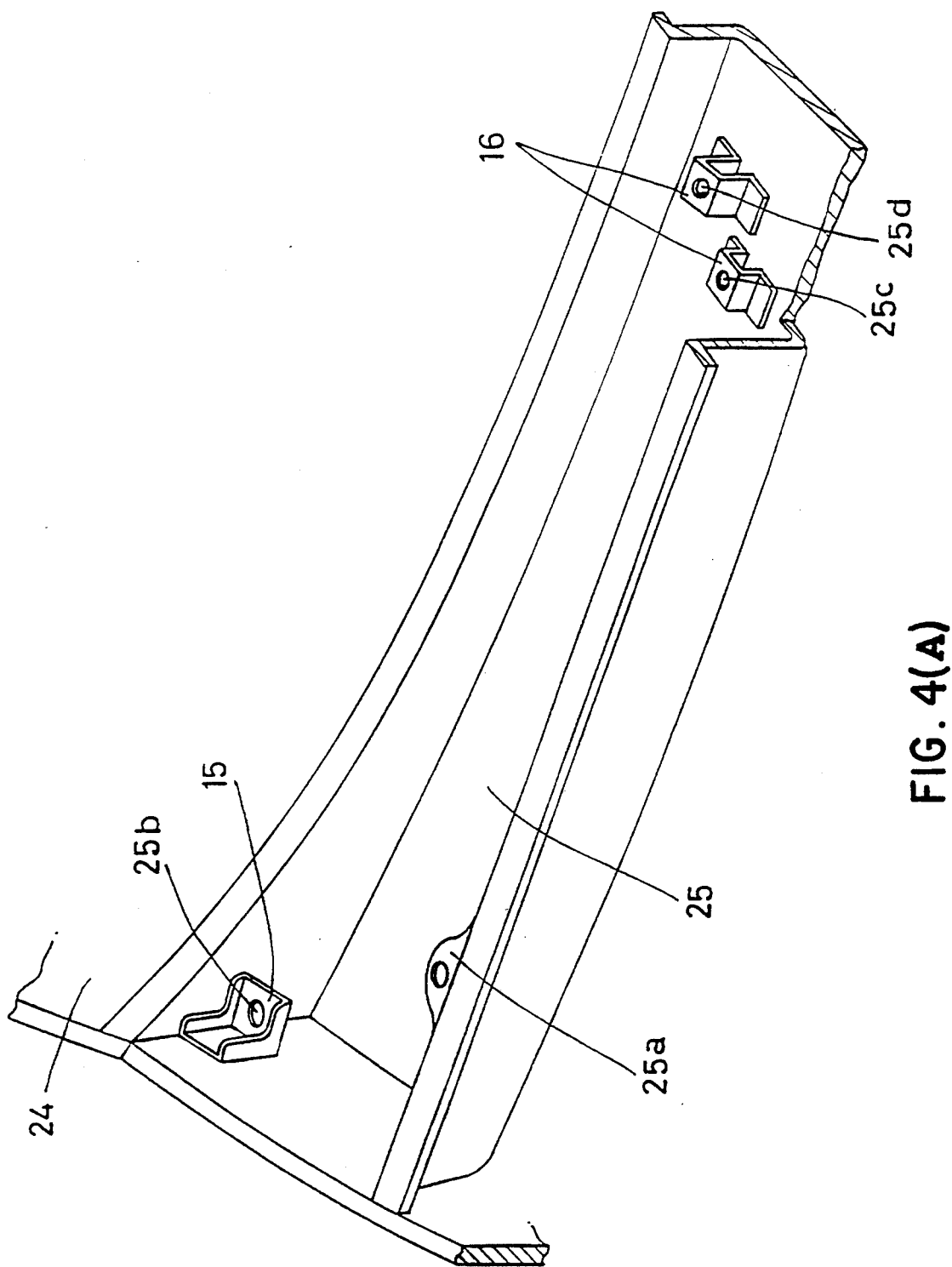
FIGS. 4(A) and 4(B) are a plan view and a side sectional view, respectively, of a cowl section.
Figure 4B:
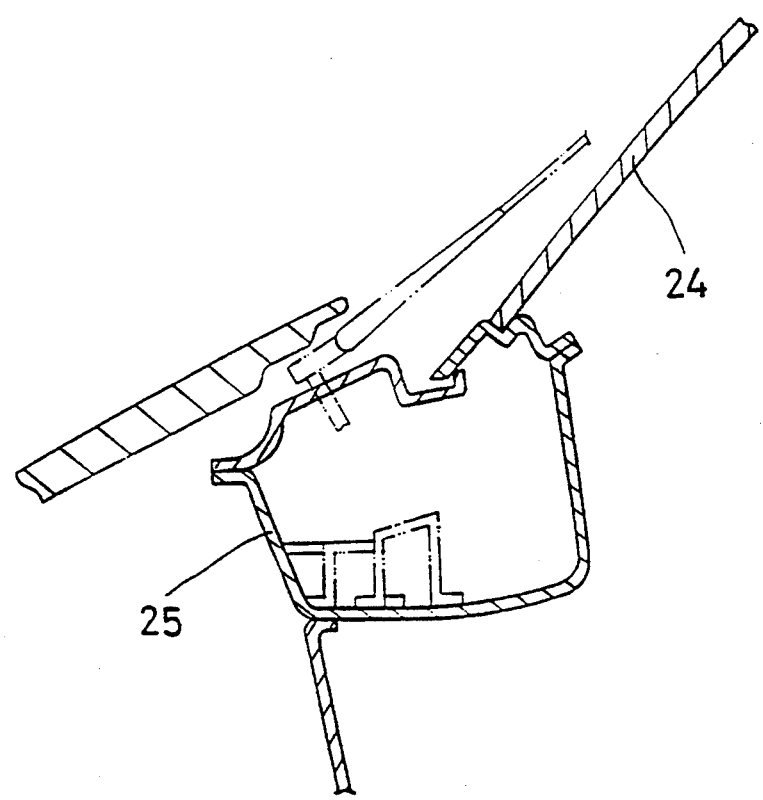
Figure 5:
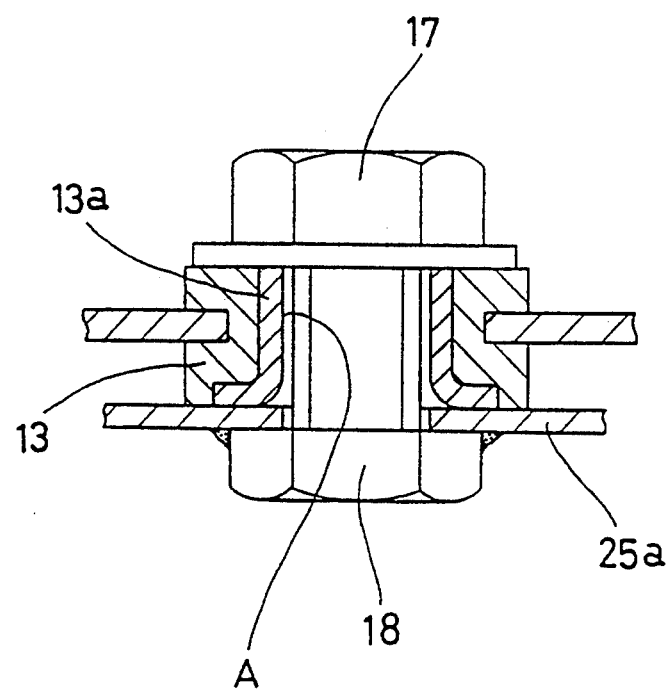
FIG. 5 is a sectional view of a section around a mounting hole A.
Figure 6:
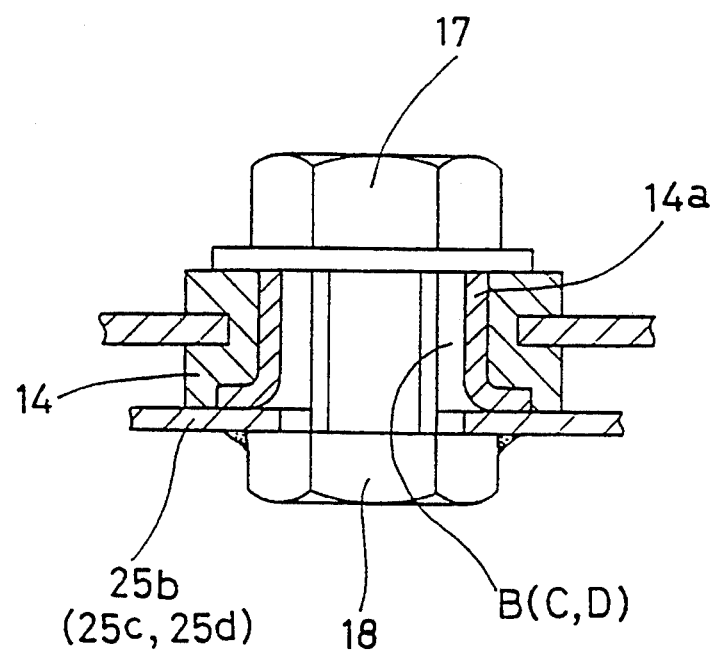
FIG. 6 is a sectional view of a section around a mounting hole B, C or D.

The above wiper device 1 is mounted on a cowl 25, in FIG. 4, provided in front of a windshield 24 of the vehicle body. Formed on the cowl 25 are mounting seats 25a, 25b, 25c and 25d, which correspond to the four mounting holes A, B, C and D mentioned above. The mounting seat 25a which corresponds to the small-diameter mounting hole A is formed directly on the cowl 25 by drawing. The mounting seat 25b corresponding to the mounting hole B is formed on a mounting stay 15 which is welded to the cowl 25. The mounting seats 25c and 25d, which correspond to the mounting holes C and D, are formed on other mounting stays 16 welded to the cowl 25. With the mounting holes A through D facing the corresponding mounting seats 25a through 25d, respectively, bolts 17, in FIGS. 5 and 6, are inserted through the mounting holes A through D and are threadedly engaged with nuts 18 which are welded to the mounting seats 25a through 25d, thereby integrally fastening the wiper device 1 to the vehicle body. The outer diameter of the bolts 17 is determined such that there is substantially no play between the small-diameter mounting hole A and the bolt 17 passed therethrough, whereas there is some play between the remaining mounting holes B through D and the bolts 17. In the drawings (FIG. 2), numeral 26 indicates pivot caps fitted onto the pivot shafts 3 and 6.

In this embodiment of the present invention, constructed as described above, in FIG. 1, the wiper device 1 is formed as a modular type by integrally connecting the first and second brackets 2 and 5 through the frame member 7. When mounting this wiper device 1 on the vehicle body, the mounting holes A through D of the device are positioned in such a way as to face the corresponding mounting seats 25a through 25d. Then, by passing the bolts 17 through the mounting holes for threaded engagement, the wiper device 1 is integrally attached to the cowl 25 of the vehicle body. Here, one of the mounting holes (the mounting hole A) has a relatively small diameter and there is substantially no play between this hole and the associated bolt 17. Accordingly, this small-diameter hole serves as a positioning reference when the wiper device 1 is mounted on the vehicle body. The remaining mounting holes B through D have a relatively large diameter, so that there is some play between them and the bolts 17. Therefore, any disparity in the pitch of the mounting seats will only result in a radial displacement of the inserting positions of the bolts 17 with respect to the mounting holes B through D, thus enabling the wiper device to be mounted with such a disparity absorbed.

Thus, in the present invention, the wiper device 1 is mounted by using the four bolts 17, and one of the mounting holes (the mounting hole A) has a relatively small diameter so as to serve as a positioning reference, thereby enabling the wiper device 1 to be mounted with high accuracy. Furthermore, since the remaining mounting holes have a relatively large diameter, an accurate mounting is ensured in which any disparity in the pitch of the mounting seats, etc. is absorbed.

Moreover, since the mounting seat 25a corresponding to the small-diameter mounting hole A is directly formed on the cowl 25, the wiper device 1 can be directly mounted on a cowl, thereby making it possible to conduct mounting with higher accuracy.

In addition, the small-diameter mounting hole A in this embodiment is at a position between the remaining mounting holes B through D so as to reduce to a minimum the disparity in mounting-seat pitch for the mounting on a vehicle-body basis, thereby further enhancing the accuracy in mounting.

Figure 7:
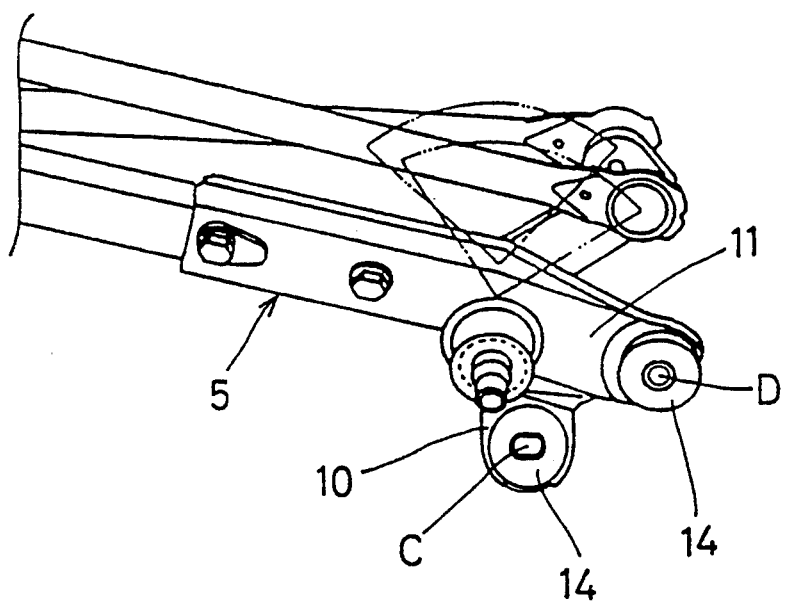
FIG. 7 is a plan view of a section around mounting holes according to a second embodiment.

The present invention is not restricted to the above-described embodiment. Apart from a modular-type wiping device which is based on two brackets which are integrated through a frame member, the present invention is applicable to a type of wiping device which is based on a single integral bracket. Further, as in the second embodiment shown in FIG. 7, of the remaining mounting holes B through D, the mounting hole C, may be formed as an elongated hole, thereby enabling the wiper device to be mounted with still higher accuracy.

Thus, in accordance with the present invention, a modular-type wiper device, based on brackets into which the various components of the wiper device are incorporated and which have a plurality of mounting holes, is mounted on a vehicle body by means of bolts and the mounting holes, one of the mounting holes has a relatively small diameter so that there is substantially no play between it and the bolt passed therethrough. Thus, by using this small-diameter mounting hole as a mounting reference, the wiper device can be positioned in a satisfactory manner with respect to the vehicle body when it is mounted thereon. Further, the remaining mounting holes have a relatively large diameter and there is some play between them and the bolts, so that any disparity in the mounting seats will only result in a radial displacement of the inserting positions of the bolts with respect to the remaining mounting holes, thus absorbing such a disparity. Thus, by using one mounting hole having a relatively small diameter as a reference, a high-accuracy mounting of a wiper device can be conducted easily and reliably.

Further, when the mounting seat corresponding to the small-diameter mounting hole is formed directly on the vehicle body side, the wiper device itself can be mounted directly on a vehicle-body basis, thereby enabling the wiper device to be mounted with a still higher level of accuracy.

What is claimed is:

1. A mounting structure on a vehicle body for a modular-type wiper device in the form of an integral unit having a plurality of wiper components, comprising:

brackets into which said wiper components are incorporated, said brackets provided with a plurality of mounting holes for mounting said wiper components to the vehicle body;

a plurality of mounting seats provided on a cowl of the vehicle body in correspondence with said mounting holes;

a plurality of fasteners passing through said plurality of mounting holes to said mounting seats to fix the brackets to the vehicle body;

wherein at least one of said plurality of mounting holes is a small-diameter mounting hole having a diameter smaller than that of the remaining mounting holes and corresponding to the dimension of the fasteners; and wherein one of the plurality of mounting seats for the fastener passed through said small-diameter mounting hole is formed integrally with the cowl of the vehicle body and the remaining mounting seats are provided on mounting stays mounted on the cowl to position the brackets and the wiper components relative to the vehicle body.

2. A mounting structure on a vehicle body for a modular-type, integrally formed wiper device, comprising:
- at least one bracket for integrating wiper components;
- a plurality of mounting holes formed in said at least one bracket;
- a plurality of mounting seats provided on a cowl of the vehicle body corresponding to said mounting holes;
- fastening means for fastening said wiper device to said mounting seats through said mounting holes, said fastening means passing through the mounting holes to the mounting seats to fix the at least one bracket to the vehicle body;
- wherein at least one of said mounting holes is a small-diameter mounting hole having a diameter smaller than that of the remaining mounting holes and corresponding to the dimension of the fastening means; and
- wherein one of the plurality of mounting seats for said at least one small-diameter mounting hole is formed integrally with the cowl of said vehicle body and the remaining mounting seats are provided on mounting stays mounted on the cowl so as to position the bracket and the wiper components relative to the vehicle body.

3. A mounting structure as recited in claim 2, wherein said fastening means are nuts and bolts.

4. A mounting structure, as recited in claim 3, wherein:
- said bolts are of the same diameter; and
- said small-diameter mounting hole has a diameter substantially the same as said bolts.

5. A mounting structure as recited in claim 2, wherein at least one of said mounting holes is elongated.

6. A mounting structure in a vehicle body for a modular-type integrally formed wiper device, comprising:
- two brackets for integrating wiper components;
- two mounting holes formed in each of said brackets;
- four mounting seats provided on a cowl of the vehicle body corresponding to said mounting holes; and
- nut and bolt fasteners for fastening said wiper device to said mounting seats through said mounting holes, the bolt fasteners passing through the mounting holes to the mounting seats to fix the brackets to the vehicle body;
- wherein one of said mounting holes is a small-diameter mounting hole having a diameter smaller than that of the remaining mounting holes and corresponding to the diameter of the bolt fasteners so as to reduce a clearance between said small-diameter mounting hole and a bolt fastener passed through said small-diameter mounting hole; and
- wherein one of said mounting seats is formed integrally with the cowl of the vehicle body and receives a bolt fastener extending through said small-diameter mounting hole and the remaining mounting seats are provided on mounting stays mounted on the cowl so as to position the brackets and the wiper components relative to the vehicle body.

7. A mounting structure, as recited in claim 6, wherein:
- said bolts are of the same diameter; and
- said small-diameter mounting hole has a diameter substantially the same as the diameter of said bolts.

8. A mounting structure, as recited in claim 6, wherein at least one of said mounting holes is elongated.

* * * * *